United States Patent [19]

Lionel

[11] 4,242,363
[45] Dec. 30, 1980

[54] UREA-BASED FEED SUPPLEMENT

[75] Inventor: Bueno Lionel, Aussonne, France

[73] Assignee: Institut National de la Recherche Agronomique (INRA), Paris, France

[21] Appl. No.: 954,774

[22] Filed: Oct. 26, 1978

[30] Foreign Application Priority Data

Oct. 27, 1977 [FR] France .................. 77 32842

[51] Int. Cl.$^3$ ............................. A23K 1/22
[52] U.S. Cl. ................... 426/69; 426/71; 426/615
[58] Field of Search .................. 426/69, 71, 72

[56] References Cited

U.S. PATENT DOCUMENTS 2,328,355  8/1943  Oleson ...................... 426/72 X

OTHER PUBLICATIONS

Hilbert, G. E., J. Am. Chem. Soc., 54, 2076-2083 (1932).
Wing, J. M., J. Dairy Sci., 40, 337-339, (1957).

Primary Examiner—Robert A. Yoncoskie
Attorney, Agent, or Firm—Shlesinger, Arkwright, Garvey and Dinsmore

[57] ABSTRACT

A feedstuff supplement comprising urea or a derivative thereof as a source of nutritive nitrogen and a compound selected from the group consisting of orotic acid and derivatives of orotic acid of the formula

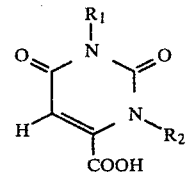

wherein $R_1$ and $R_2$ are independently hydrogen, alkyl, glucosyl or ribosyl, in a minor proportion for increasing the assimilation of urea by herbivorous animals, and a vegetable based feedstuff containing the supplement.

3 Claims, 1 Drawing Figure

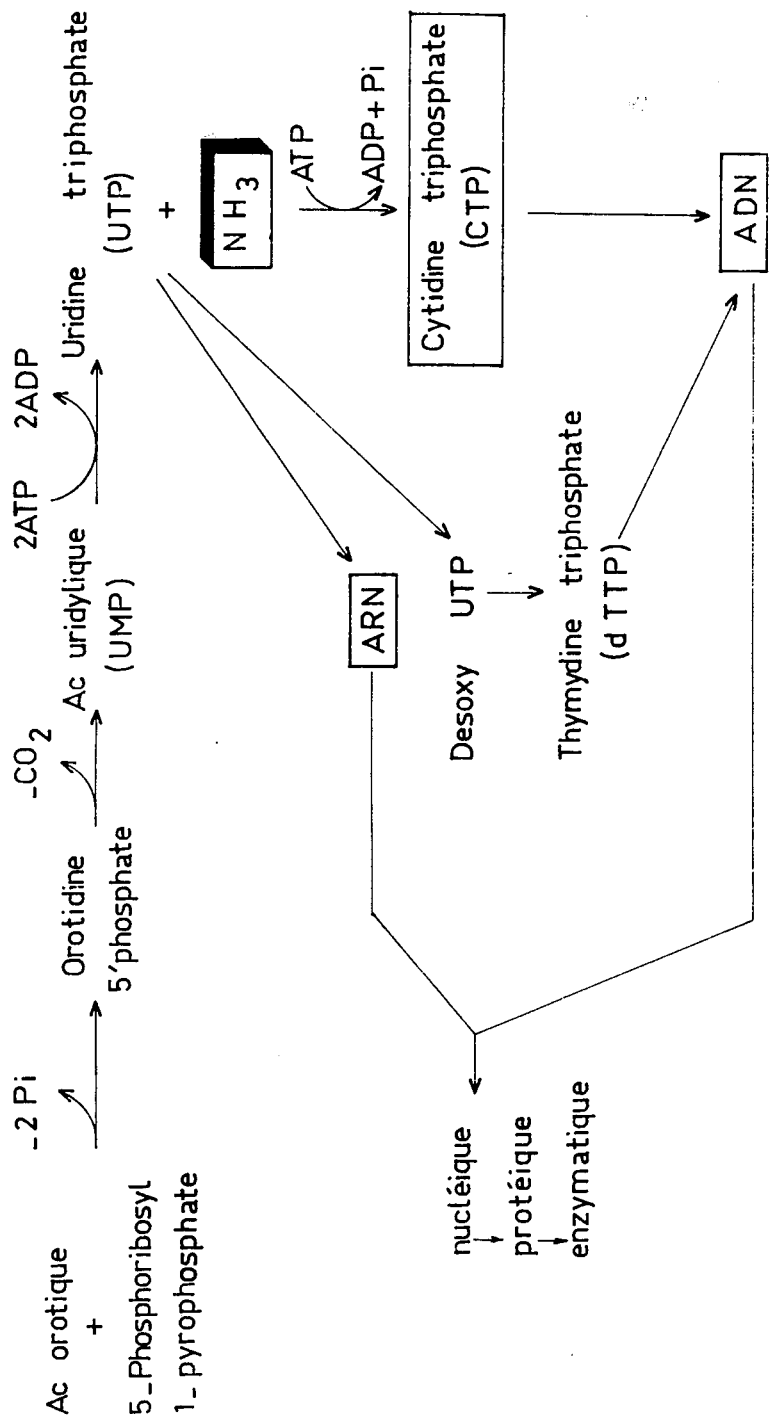

UREA-BASED FEED SUPPLEMENT

The invention relates to a feed supplement based upon urea or a compound derived from urea, which is intended for herbivorous animals, more especially polygastric ruminants. The invention also includes a supplemented feedstuff produced using this supplement.

By "compound derived from urea" is meant compounds derived from urea which are capable of undergoing bacterial breakdown of the ureolytic kind accompanied by the production of ammonia, which derivatives may, in known manner, be substituted for urea to supplement animal feedstuffs. The derivatives in question are the following: biuret, triuret, salts of urea (in particular phosphates), uric acid and diureidoisobutane (DIUB).

It is known that, when feeding ruminants, substantial savings can be made by partially replacing vegetable protein by urea or a derivative of urea, the cost of which is very much less than that of the vegetable protein in question. However, urea very quickly breaks down into ammonia in the rumen and the resulting toxicity prevents it from being added in large amounts since the feedstuff becomes dangerous (due to metabolic disorders, anorexia, etc) when the percentage by weight of urea contained in it is of the order of more than 1.5%.

In view of the economic benefit of adding urea, manufacturers have tried to overcome this restriction and there are at present on the market feed additives in which the urea is coated or fixed by means of various carriers which enable a greater proportion of urea, up to approximately 2% by weight, to be added to feedstuffs without the risk of poisoning the animal. The coating processes involved have the drawback that they are expensive to operate and their effectiveness is very much a relative matter since in practice a percentage of 2% cannot be exceeded. As an example, U.S. Pat. Specification No. 2,560,830 (Turner) discloses a supplemented feedstuff produced from coated urea, which also contains, in the case of this example, various substances (micro-organism cultures, essential amino acids) which tend to increase the effectiveness of the coating.

It has also been suggested in certain publications (U.S. Pat. Specification No. 2,328,355; French Pat. Specification No. 1,569,124; French Pat. Specification No. 1,392,643 and the "Journal of Dairy Science", volume 40 (1957) J. M. Wing, pages 337–339) that orotic acid or closely related substances be used as a direct feed supplement, these substances being admixed with the feedstuff so that they can be directly assimilated with a view to accelerating the growth of the animal. However, it appears that these techniques have not in fact been put into practice because, when acting as direct nutritive supplements, the substances concerned need to be incorporated in considerable proportions to produce any useful enrichment of the feedstuff and, in practice, their high cost means that the economics of the operation are very unfavourable: for the same nutritional value, the manufacturing cost of a feedstuff supplemented in this way is in fact higher than that of a conventional, purely vegetable feedstuff.

The present invention aims to provide a more effective way of overcoming the restriction upon the addition of urea referred to above, by providing a supplement based upon urea or a derivative compound whose production cost is moderate and which is capable of containing urea or its derivative in very much larger proportions than those feasible at present.

The object of the invention is therefore to enable larger amounts of urea to be added to a feedstuff without danger, with a view to taking advantage of the low cost of the non-protein-nitrogen available from the urea or the derivative compound as compared with that of vegetable protein nitrogen.

The feed supplement to which the invention relates is a product based upon urea or a derivative compound which is intended to be admixed with a feedstuff for herbivorous animals. In accordance with the invention this product comprises, admixed with urea or the derivative compound, an additive formed by orotic acid:

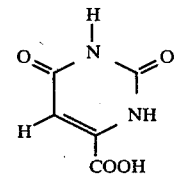

or a derivative of orotic acid having the following general formula:

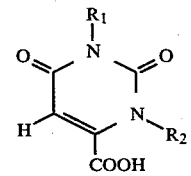

in which each of the groups $R_1$ and $R_2$ is formed by one of the following groups: hydrogen, methyl, alkyl, glucosyl or ribosyl.

The addition of orotic acid or the derivative compound to urea considerably increases the rate at which the ammonia produced by the ureolysis of the urea by the microflora in the rumen is assimilated, with the result that, as will become clearer below, the phenomenon of ammonia build-up in the rumen which is the cause of the disorders resulting from an excess of urea either disappears or is considerably reduced. Orotic acid or the derivative compound is an expensive product but the effectiveness with which it performs its function as a factor in increasing the rate at which ammonia is assimilated is very great and as a result only a very small proportion is quite adequate. It is essential to note that, in the invention, the nutritional supplement to the feedstuff is formed by urea (or a derivative thereof) which is very cheap, the action of the orotic acid being not direct but linked with the presence of the urea (specifically, orotic acid on its own in a very small proportion would have no noticeable effect on the nutritional value of the feedstuff).

The supplement according to the invention thus enjoys very favourable economics and in particular economics which are distinctly more favourable than those of known coating processes.

The orotic acid or its derivative may be in the form of a powdered or granular product which is intended to be uniformly admixed with the urea and the feedstuff by sprinkling and physical mixing. It may also be in the form of a solution, more especially an aqueous solution, which is intended for mixing by impregnation.

Orotic acid can exist in two chemical forms, anhydrous and monohydrate. Both forms are equally effective and the monohydrate form is merely preferable in the case of impregnation with a solution because it is more soluble in water.

Orotic acid and its derivatives are well known substances which are commercially available. Orotic acid can be produced by various known processes (chemical synthesis from urea and an ester of oxalacetic acid, microbial fermentation on a pyrimidine-based nutritive substrate, etc.).

Experiments have shown that the use of the supplement of the invention allows an increase of more than 100% in the tolerance threshold for urea and makes it possible to achieve proportions by weight of the order of 4 to 5% of urea, irrespective of how the feed is administered.

Furthermore, an additional advantage which has been revealed lies in the fact that the additive formed by orotic acid or a derivative promotes bacterial growth in the rumen of the animal, which results in better utilisation of the ammonia and is reflected, for the animal, in a very much greater (an increase of up to 200% depending upon the amounts added) supply of protein (of bacterial origin).

Tests have shown that it is advisable to use between approximately 5 and 100 milligrams of orotic acid or derivative to one gram of non-protein-nitrogen present in the urea or derivative compound, which corresponds to approximately 2.5 to 50 milligrams of orotic acid per gram of urea.

In practice, a proportion of 20 to 60 milligrams of orotic acid per gram of non-protein-nitrogen results in excellent effectiveness on the part of the additive while keeping the cost of the supplemented feed moderate.

As a first step, the orotic acid or its derivative may be admixed with the urea or urea derivative in the proportions indicated above, to produce a feed supplement which will subsequently be admixed with a feedstuff for herbivorous animals, the supplement taking the form of a powdered or granular product which enables it to be readily admixed, by physical mixing, with the basic feedstuff comprising a base of vegetable origin.

The orotic acid or its derivative and the urea or urea derivative may also be admixed with the feed directly, either separately from one another or simultaneously, to provide a supplemented feedstuff ready for use.

Whatever method of incorporation is selected, the mixture is preferably produced in such a way that:

the proportion by weight, referred to 1 kilogram of feedstuff, is between approximately 5 and 25 grams of non-protein-nitrogen derived from the urea or derivative compound, the proportion by weight of orotic acid or orotic acid derivative relative to the urea or derivative thereof is between 5 and 100 milligrams of orotic acid or derivative to 1 gram of non-protein-nitrogen present in the urea or derivative compound.

With the ranges defined above it is possible to produce a supplemented feedstuff which is of moderate cost, which contains economically beneficial amounts of urea, and which presents no danger to the animal.

The action and effectiveness of the orotic acid or its derivative may be explained in the context of the invention by analysing the process by which urea is digested in ruminants. The urea is first of all broken down into ammonia by bacterial flora (ureolysis). This ammonia is then assimilated by the bacteria for their natural protein synthesis. The rate of ureolysis is very high when the reaction in question involves urea or a derivative compound and the protein synthesis which follows is incapable of assimilating all of the ammonia which is released, the ammonia then building up in the rumen and becoming toxic when it passes into the animal's blood stream.

The novelty of the invention lies in the fact that the additive which is added has the property of considerably increasing the rate at which ammonia is assimilated by the bacteria and also the rate of protein synthesis, with the result that there is no longer a build up of ammonia (or the build up is considerably reduced). As experiments performed by the inventor have shown, this property is related to the combination of the carboxylic group COOH and the uracil group.

It should also be mentioned that, in the event of a considerable build up of ammonia as a result of the presence of too great a quantity of urea, the additive, by virtue of its acidity, restricts the rate at which the ammonia passes into the blood, which tends to decrease its toxic effect. This side effect enables the permissible proportion of urea to be increased still further since a certain amount of ammonia build up can be tolerated.

The biological process which endows orotic acid or its derivative compounds with such properties may be summarised thus: through a succession of irreversible biological conversions it leads to uridine triphosphate (UTP), which is a labile compound which, by the addition of one molecule of $NH_3$, very quickly converts into cytidine triphosphate. The latter is very quickly incorporated into nucleic acids and thus stimulates synthesis of both proteins and enzymes. These changes take place at fast rates, which explains the effectiveness of orotic acid and the derivative compounds.

The single FIGURE of the accompanying drawings is a diagram illustrating these biological conversions of orotic acid by bacteria.

The following description gives on the one hand a comparative example of laboratory testing and on the other an example of a dietary application.

COMPARATIVE EXAMPLE

The tests were conducted on a batch of six adult ewes (Lacaune breed, weight of the order of 50 to 60 kg), fed on an unrationed diet of hay given at 8 o'clock each morning.

During the first testing period $E_1$ lasting three weeks, 20 grams of urea alone was introduced directly into the rumen of the animals, by means of a canula, at 8.30 a.m. on two days per week.

During a second testing period $E_2$ also lasting three weeks (the tests being performed on the same animals one month after the conclusion of the first tests), 20 grams of urea, to which 10 grams of orotic acid had been added, was introduced under the same conditions.

In both series of tests checks were made on the appearance of symptoms of poisoning, the ammonia concentration in the contents of the rumen, feedstuff consumption and the level of bacterial protein synthesis during the course of an administration of starch (300 grams).

1. Symptoms of Poisoning

In 31 cases out of the 36 observed (6 animals and 6 injections), the $E_1$ tests showed that the addition of urea alone is followed within 10 to 12 minutes after injection by nervous symptoms (tremors: more or less pronounced trembling), a sudden cessation of feeding activity, both ingestion and rumination, and hypersalivation. In two cases out of the 36, the poisoning necessitated urgent medical attention to save the animal, the contents of the rumen being acidified with three liters of a 5% solution of acetic acid.

In the $E_2$ series of tests no symptoms of poisoning were observed.

2. Ammonia Concentration in the Digestive Contents

In the $E_1$ series of tests the average concentration in the rumen changed from approximately $11.4 \pm 2.1$ milligrams per 100 milliliters before the injection of urea alone to $137 \pm 21$ milligrams per 100 milliliters 60 minutes after injection, and to $88 \pm 8$ mg four hours after injection.

In the $E_2$ series of tests, the average concentration, which was comparable before injection, changed to $97 \pm 16$ mg per 100 milliliters 60 minutes after injection of urea and orotic acid, and to $52 \pm 6$ mg four hours after injection.

It can be seen that the presence of orotic acid on the one hand considerably reduces the maximum concentration and on the other considerably accelerates the return to physiological values.

2. Feedstuff Consumption

The average consumption over a reference period prior to testing was $1090 \pm 164$ grams of dry matter per 24 hours per animal.

In the $E_1$ tests, this consumption was reduced by 54% the first day after injection and by 21% the next day, which reflects the pronounced anoretic effect of urea in large amounts.

In the $E_2$ tests, the consumption did not alter significantly either on the first day or the second day.

4. Level of Protein Synthesis

In the course of the testing periods the administration of urea alone ($E_1$) or of urea plus orotic acid ($E_2$) was accompanied, once for each animal, by the addition of 300 grams of starch to the rumen.

In the case of the $E_1$ tests, in the next four hours the concentration of bacterial protein nitrogen changed from 44 mg (before injection) to 55 mg, per 100 milliliters of digestive content.

In the $E_2$ tests, the same concentration changed from 46 mg to 72 mg, which is equivalent to an increase of 136% in the amount of protein nitrogen synthesized from the same quantity of urea administered.

To conclude this comparative example, it must be stressed that the amounts of urea administered were administered suddenly (a swift injection rather than oral administration spread out in time) and in very large doses to make the comparative experiment meaningful and significant. Similarly, the doses of orotic acid used were very high to match the doses of urea and in practice the amounts used for mixing with feedstuffs would be much smaller.

The effectiveness of orotic acid was found to be excellent since, as an additive, it made it possible for large doses of urea to be tolerated without disorders occuring and since it caused the ammonia formed to be more satisfactorily utilised with a very much increased supply of protein.

It should also be mentioned that the tests confirmed a known property of orotic acid, namely its non-toxicity even in large doses.

Example of Dietary Application

This test was carried out on four adult ewes (Lacaune breed) subject to so-called "intensive rearing" conditions, that is to say, conditions in which the ewes received a concentrated feedstuff as their main nourishment. In the present case this feedstuff was the only one administered.

This concentrated feedstuff was obtained by enriching a standard feedstuff of the "Ufac dairy cow feedstuff with urea" type (a base of vegetable origin plus urea) with urea by impregnation. Orotic acid was added to the feedstuff in the course of this impregnation by using a solution containing both urea and orotic acid.

The supplemented feedstuff produced in this way contained molasses and maize, offal, urea, peanuts, soya, alfalfa flour, vitamins A and $D_3$ and orotic acid, and had the following composition:

| | |
|---|---|
| Cellulosic materials: | 9.5% |
| Mineral materials: | 9% |
| Crude protein materials: | 23.9% of which 11.6% (N $\times$ 6.25) was supplied by 4% of urea (40 gm per Kg of feedstuff) and 12.3% by vegetable protein. |
| Fatty substances: | 2% |
| Moisture: | 14% |
| Orotic acid: | 0.1% |
| Non-nitrogenous extractive: | remaining percentage |

This feedstuff was given freely to the animals for a period of ten days.

The average daily consumption was $1610 \pm 200$ gm of dry matter per animal. The animals developed a normal appetite and there were no particular symptoms or disorders. The average concentration of ammonia remained below 45 mg per 100 milliliters of the contents of the rumen, which is perfectly tolerable for the organism and well below the toxicity threshold. This concentration remained stable after the second day, with no long term increase, which shows that the ammonia is satisfactorily utilised without building up even at peak ingestion times.

A comparative test on the same batch of animals after an interval of fifteen days revealed that the same feedstuff, without the feedstuff additive according to the invention and with the same percentage of urea (4%), resulted in pronounced anorexia from the third day, and that the level of daily ingestion did not exceed 1,000 gm of dry matter. From the second day the average concentration of ammonia in the rumen rose above the toxicity threshold (approximately 80 to 90 mg per 100 milliliters of rumen content) at certain times during the day.

In fact, with a diet having a concentrated cereal base, the maximum tolerated percentage of urea in the absence of the additive according to the invention is of the order of 1.6 to 2%. Thus, the additive according to the invention enables approximately half the nitrogen derived from vegetable protein to be replaced by nitrogen derived from urea, assuming it is desired to maintain the same percentage of crude protein matter. This substitution, even allowing for the addition of the orotic acid, is reflected in a considerable reduction in the manufacturing cost of the feedstuff.

I claim:
1. A feedstuff supplement for admixture with a feedstuff for herbivorous animals comprising urea or a derivative thereof as a source of nutritive nitrogen and approximately 5 to 100 milligrams of orotic acid per gram of non-protein nitrogen in said urea or derivative.

2. A feedstuff supplement as in claim 1 and wherein said supplement is in powdered or granular form for physical mixing with the feedstuff.

3. A feedstuff for herbivorous animals comprising a feed base of vegetable origin enriched with a supplement containing urea or a derivative thereof as a source of nutritive nitrogen and orotic acid, said feedstuff containing approximately 5 to 25 grams of non-protein-nitrogen per kilogram of feedstuff and about 5 to 100 milligrams of orotic acid per gram of non-protein-nitrogen.

* * * * *